(12) United States Patent
Bonzi et al.

(10) Patent No.: US 12,136,110 B2
(45) Date of Patent: Nov. 5, 2024

(54) AUTOMATIC GENERATION OF ELECTRONIC ADVERTISING MESSAGES CONTAINING ONE OR MORE AUTOMATICALLY SELECTED STOCK PHOTOGRAPHY IMAGES

(71) Applicant: 2KDirect, Inc., San Luis Obispo, CA (US)

(72) Inventors: Joe Bonzi, San Luis Obispo, CA (US); Jason Brown, San Luis Obispo, CA (US); Shane Thomas, San Luis Obispo, CA (US)

(73) Assignee: 2KDirect, Inc., San Luis Obispo, CA (US)

( * ) Notice: Subject to any disclaimer, the term of this patent is extended or adjusted under 35 U.S.C. 154(b) by 0 days.

(21) Appl. No.: 18/095,989

(22) Filed: Jan. 11, 2023

(65) Prior Publication Data

US 2023/0162242 A1 May 25, 2023

Related U.S. Application Data

(63) Continuation of application No. 16/856,018, filed on Apr. 22, 2020, now Pat. No. 11,574,343, which is a continuation of application No. 15/242,848, filed on Aug. 22, 2016, now Pat. No. 10,672,037, which is a continuation of application No. 13/542,605, filed on
(Continued)

(51) Int. Cl.
| | |
|---|---|
| *G06Q 30/0241* | (2023.01) |
| *G06F 16/58* | (2019.01) |
| *G06F 16/583* | (2019.01) |
| *G06F 16/9535* | (2019.01) |
| *G06F 16/9538* | (2019.01) |
| *G06Q 30/0251* | (2023.01) |

(52) U.S. Cl.
CPC ..... *G06Q 30/0277* (2013.01); *G06F 16/5838* (2019.01); *G06F 16/5866* (2019.01); *G06F 16/9535* (2019.01); *G06F 16/9538* (2019.01); *G06Q 30/0263* (2013.01); *G06Q 30/0276* (2013.01)

(58) Field of Classification Search
CPC ........... G06Q 30/0277; G06Q 30/0263; G06Q 30/0276; G06F 16/5838; G06F 16/5866; G06F 16/9535; G06F 16/9538
See application file for complete search history.

(56) References Cited

U.S. PATENT DOCUMENTS

| | | | |
|---|---|---|---|
| 6,393,407 B1 | 5/2002 | Middleton, III et al. | |
| 6,963,863 B1 | 11/2005 | Bannon | |
| (Continued) | | | |

FOREIGN PATENT DOCUMENTS

| | | |
|---|---|---|
| WO | 2007027453 | 3/2007 |

OTHER PUBLICATIONS

Promote—How It Works, http://ipromote.com/works.asp, 1 pg., Internet accessed Jan. 22, 2008.
(Continued)

*Primary Examiner* — Jay A Morrison
(74) *Attorney, Agent, or Firm* — Perkins Coie LLP

(57) ABSTRACT

A facility for constructing a display module in connection with a web page is described. The facility obtains content associated with the web page and uses the obtained content to generate a query used to select an image. The facility then generates the display module that incorporates the selected image.

20 Claims, 14 Drawing Sheets

Related U.S. Application Data

Jul. 5, 2012, now Pat. No. 9,436,953, which is a continuation of application No. 12/572,207, filed on Oct. 1, 2009, now abandoned.

(56) References Cited

U.S. PATENT DOCUMENTS

| | | | |
|---|---|---|---|
| 7,386,572 | B2 | 6/2008 | Kramer |
| 7,428,497 | B2 | 9/2008 | Agarwal et al. |
| 7,707,127 | B2 | 4/2010 | Jhala et al. |
| 7,870,497 | B2 | 1/2011 | Greer et al. |
| 8,356,253 | B2 | 1/2013 | Greer et al. |
| 8,930,832 | B2 | 1/2015 | Greer et al. |
| 8,965,786 | B1 * | 2/2015 | Frumkin ............ G06Q 30/0242 |
| | | | 705/14.6 |
| 9,361,632 | B2 | 6/2016 | Greer et al. |
| 9,436,953 | B1 | 9/2016 | Bonzi et al. |
| 9,805,393 | B2 | 10/2017 | Greer et al. |
| 10,068,253 | B2 | 9/2018 | Greer et al. |
| 10,672,037 | B1 | 6/2020 | Bonzi et al. |
| 11,164,219 | B1 | 11/2021 | Bonzi et al. |
| 11,574,343 | B2 | 2/2023 | Bonzi et al. |
| 2001/0029465 | A1 | 10/2001 | Strisower |
| 2002/0078045 | A1 | 6/2002 | Dutta |
| 2002/0103698 | A1 | 8/2002 | Cantrell |
| 2004/0186775 | A1 | 9/2004 | Margiloff et al. |
| 2004/0205514 | A1 | 10/2004 | Sommerer et al. |
| 2005/0235030 | A1 | 10/2005 | Lauckhart et al. |
| 2006/0122884 | A1 | 6/2006 | Graham et al. |
| 2006/0212350 | A1 | 9/2006 | Ellis et al. |
| 2007/0050253 | A1 | 3/2007 | Biggs et al. |
| 2007/0083810 | A1 | 4/2007 | Scott et al. |
| 2007/0156524 | A1 | 7/2007 | Grouf et al. |
| 2007/0239530 | A1 | 10/2007 | Datar et al. |
| 2007/0260515 | A1 | 11/2007 | Schoen et al. |
| 2007/0260516 | A1 | 11/2007 | Schoen et al. |
| 2007/0271370 | A1 | 11/2007 | Kehl |
| 2007/0300152 | A1 | 12/2007 | Baugher |
| 2008/0109300 | A1 | 5/2008 | Bason |
| 2008/0140476 | A1 | 6/2008 | Anand et al. |
| 2008/0195957 | A1 | 8/2008 | Kim et al. |
| 2008/0228720 | A1 | 9/2008 | Mukherjee et al. |
| 2008/0243826 | A1 | 10/2008 | Bartz et al. |
| 2008/0306809 | A1 | 12/2008 | Kwak et al. |
| 2009/0012863 | A1 | 1/2009 | Saephan |
| 2009/0024718 | A1 | 1/2009 | Anagnostopoulos et al. |
| 2009/0099901 | A1 | 4/2009 | Sah et al. |
| 2009/0138351 | A1 | 5/2009 | Shih et al. |
| 2009/0187477 | A1 * | 7/2009 | Bardin ............... G06Q 30/0273 |
| | | | 705/14.69 |
| 2009/0240564 | A1 | 9/2009 | Boerries et al. |
| 2009/0265163 | A1 | 10/2009 | Li et al. |
| 2009/0271260 | A1 | 10/2009 | Sharma et al. |
| 2010/0036883 | A1 * | 2/2010 | Valencia-Campo ........................ |
| | | | G06F 16/5838 |
| | | | 707/E17.02 |
| 2010/0082429 | A1 | 4/2010 | Samdadiya et al. |
| 2010/0299213 | A1 | 11/2010 | Yeganeh |
| 2014/0310100 | A1 | 10/2014 | Broder et al. |
| 2016/0307238 | A1 | 10/2016 | Bonzi et al. |
| 2017/0213248 | A1 | 7/2017 | Jing et al. |
| 2018/0218401 | A1 | 8/2018 | Greer et al. |
| 2018/0341983 | A1 | 11/2018 | Dean et al. |
| 2018/0365707 | A1 | 12/2018 | Jha et al. |
| 2018/0374122 | A1 | 12/2018 | Greer et al. |
| 2019/0259057 | A1 | 8/2019 | Kapadia et al. |

OTHER PUBLICATIONS

International Search Report and Written Opinion; International Patent Application No. PCT/US09/31614; Filed: Jan. 21, 2009; Applicant: 2KDirect, LLC; dated Mar. 3, 2009.

"Snap Preview Anywhere Adoption Skyrockets as Web Publishers and Bloggers Embrace Ability to Include Previews on Sites", Snap for Immediate Release. Pasadena, California, Dec. 18, 2006, 2 pages.

"Snap.com Announces Snap Shots", blog.snap.com. San Francisco, California, Apr. 16, 2007. Available at http://blog.snap.com/2007/04/16/snapcom-announces-snap-shots, 5 pages. [Last Accessed: Oct. 19, 2008].

* cited by examiner

FIG. 4

| listing ID | target site | product category | version |
|---|---|---|---|
| 1 | cars.com | 11 | 1 |
| ... | ... | ... | ... | listing table — 600
— 611
— 601  — 602  — 603  — 604

*FIG. 6* parsing instructions table — 700

| listing ID | property name | count | container element | container class | container attribute | search expression | ignore case |
|---|---|---|---|---|---|---|---|
| 1 | member_name_val | 1 | span | member_name | | | |
| 1 | title | 1 | title | | | \n(.*)\n | yes |
| 1 | location | 1 | span | location | | | |
| 1 | price | 1 | span | price | | | yes |
| 1 | photo | 3 | img | | src | http://images.cars.com/thumbnail/DMI/[^"]+.jpg | |
| 1 | header_color | 1 | header_color | | val | | |
| 1 | background_color | 1 | background_color | | val | | |
| 1 | title_font_color | 1 | title_font_color | | val | | |
| 1 | body_font_color | 1 | body_font_color | | val | | |
| ⋮ | ⋮ | ⋮ | ⋮ | ⋮ | ⋮ | ⋮ | ⋮ |

| category | term | weight | |
|---|---|---|---|
| | | | category matching table ⟵ 1300 |
| Food & Dining | restaurant | .96 | ⟵ 1311 |
| Food & Dining | server | .12 | ⟵ 1312 |
| Food & Dining | food server | .44 | ⟵ 1313 |
| Food & Dining | cuisine | .87 | ⟵ 1314 |
| ⋮ | ⋮ | | |
| Computers | server | .37 | ⟵ 1315 |
| Computers | blade server | .73 | ⟵ 1316 |
| ⋮ | ⋮ | | |
| Travel | hotel | .71 | ⟵ 1317 |
| Travel | airline | .59 | ⟵ 1318 |
| Travel | flight | .68 | ⟵ 1319 |
| ⋮ | ⋮ | | |
| ⟵ 1301 | ⟵ 1302 | ⟵ 1303 | |

*FIG. 13*

AUTOMATIC GENERATION OF ELECTRONIC ADVERTISING MESSAGES CONTAINING ONE OR MORE AUTOMATICALLY SELECTED STOCK PHOTOGRAPHY IMAGES

CROSS REFERENCE TO RELATED APPLICATION(S)

This application is a continuation application of U.S. patent application Ser. No. 16/856,018, filed Apr. 22, 2020, which is a continuation of U.S. patent application Ser. No. 15/242,848, filed Aug. 22, 2016 (U.S. Pat. No. 10,672,037), which is a continuation application of U.S. patent application Ser. No. 13/542,605, filed Jul. 5, 2012 (U.S. Pat. No. 9,436,953), and entitled "AUTOMATIC GENERATION OF ELECTRONIC ADVERTISING MESSAGES CONTAINING ONE OR MORE AUTOMATICALLY SELECTED STOCK PHOTOGRAPHY IMAGES," which is a continuation application of U.S. patent application Ser. No. 12/572,207, filed on Oct. 1, 2009, and entitled "AUTOMATIC GENERATION OF ELECTRONIC ADVERTISING MESSAGES CONTAINING ONE OR MORE AUTOMATICALLY SELECTED STOCK PHOTOGRAPHY IMAGES," each of which is herein incorporated by reference in its entirety.

TECHNICAL FIELD

The described technology is directed to the field of online advertising, and more particularly, to the field of automatic generation of electronic advertising messages.

BACKGROUND

The world wide web ("the web") permits companies and individuals to electronically publish content in the form of web pages that can be retrieved and displayed using a browser program running on a client computer system. Such "publishers" often sell to advertisers opportunities to present advertising messages together with their published content.

For example, an advertiser who is a music publisher may purchase opportunities to present an advertising message promoting a new music CD published by the publisher. The advertising message may be "rich" in a variety of ways. They may, for example, include text identifying the title of the CD and the responsible artist in a style that is visually compatible with an appealing background pattern and/or color, a series of multiple photos of the artist, a link to a web page on which the user can listen to the artist's music and purchase the CD, etc. Some publishers, in addition or instead of such rich advertising messages, provide advertisers opportunities to present textual advertising messages, which generally include only text and a link to a web page associated with the advertising message. Some textual advertising messages are search advertising messages, which specify one or more keywords, and are presented in search result web pages served by a publisher in response to a user query containing at least one of the specified keywords. Because textual advertising messages do not contain any rich content, they can be relatively straightforward to create, rendering them accessible to a wide range of advertisers.

BRIEF DESCRIPTION OF THE DRAWINGS

FIG. 4 is a display diagram showing a sample page containing a control that the user may activate in order to generate advertising messages based upon the sample page.

FIG. 6 is a table diagram showing sample contents of a listing table used by some embodiments of the facility to map from groups of model web pages to a listing ID specifying a set of parsing instructions to use to parse model web pages of the group.

FIG. 7 is a table diagram showing sample contents of a parsing instructions table used by the facility in some embodiments to specify a set of parsing instructions to use to parse a model web page.

FIG. 13 is a table diagram showing sample contents of a category matching table that identifies words and/or phrases that characterize subject matter categories.

DETAILED DESCRIPTION

Figure 1:
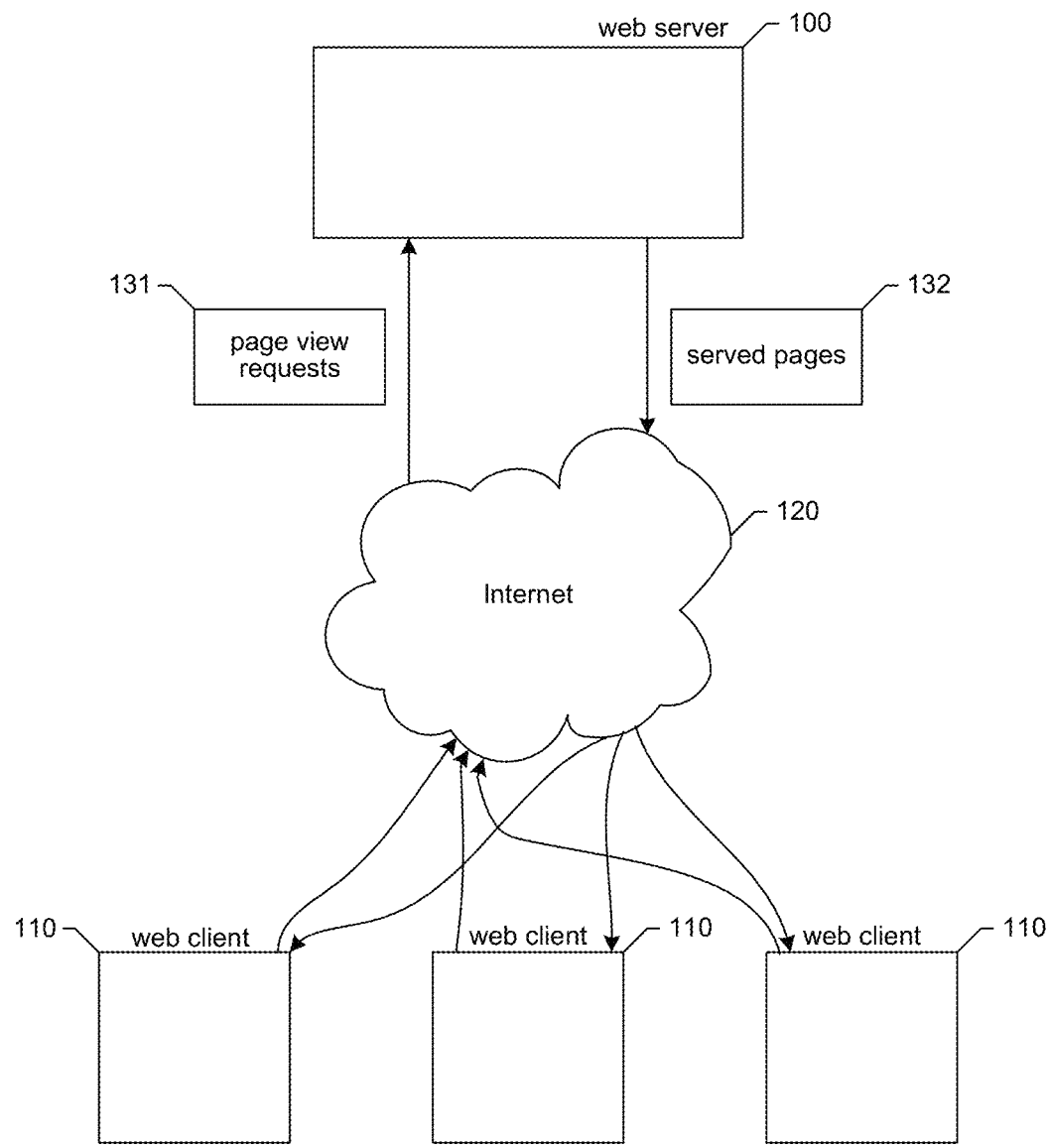
FIG. 1 is a high-level data flow diagram showing data flow within a typical arrangement of components used to provide the facility.

The inventors have recognized that the kind of rich advertising messages described above often require specialized expertise and significant effort to generate. The inventors have further recognized that these substantial requirements for effectively generating rich advertising messages tend to limit the availability of such rich advertising messages to a relatively small number of sophisticated, well-funded advertisers who are in a position to satisfy those requirements. The inventors have further recognized that, if less expertise and effort was required to effectively generate rich advertising message, rich advertising messages would become available to a much wider population of advertisers.

A software facility for automatically generating electronic advertising messages ("the facility") is described. The facility uses an existing web page—sometimes referred to as the "model web page"—as a basis for automatically generating an advertising message, such as a display advertising message. For example, the facility may use as the model web page the web page to which the advertising message will be linked, the advertiser's home page, or another page having both the content and the look and feel desired for the generated advertising message.

In some embodiments, the facility extracts elements such as background and text colors, textual content, and rich media from the model web page and populated into the advertising message. In some embodiments, the extraction is fully automatic. In some embodiments, the facility guides the user through selecting in the page the elements to be extracted. In some embodiments, the facility presents a user interface that the user may use to modify the advertising message generated by the facility.

In some embodiments, the facility performs the extraction by parsing HTML or a document in another markup language that defines the model web page. In some embodiments, the facility extracts elements from the model web page by causing the elements to be exported by the publisher of the model web page or a related page via a mechanism other than serving the model web page, such as by using a specialized interface established between the publisher of the model web page and the operator of the facility.

In some embodiments, the facility receives from a publisher a feed describing each of a number of textual advertising messages known to the publisher, such as textual advertising messages sold by the publisher, and/or textual advertising messages sold to advertisers who present information via the publisher. (Advertisers who present information via a publisher may be, for example, businesses for which a local business directory web site such as Citysearch or local.com contains a directory page, also called the business's profile page. The feed may describe special advertising messages sold to the advertiser by this publisher or other sellers.) These textual advertising messages may be search textual advertising messages, or textual advertising messages of various other types. The feed may contain essentially all of the textual advertising messages in these categories, or any subset of them. In response to receiving the feed, the facility generates one or more display advertising messages for each textual advertising message described in the feed. In particular, the description in the feed of each textual advertising message contains information, such as a URL, identifying a web page linked to from the textual advertising message or otherwise associated with the textual advertising message; the facility generates each display ad based upon the content of the identified web page. These generated display advertising messages can be presented on behalf of advertisers that were capable of generating a simple textual advertising message, but would have had trouble generating a more sophisticated display advertising message.

In some embodiments, in connection with generating an advertising message, the facility causes the generated advertising message presented by one or more publishers. In some embodiments, such presentation is in accordance with or otherwise based upon ad-buy parameters—such as price, periodic budget, and geographic region—specified by the advertiser for the textual advertising message and included in the textual advertising message feed. In various embodiments, such presentation is based upon an arrangement between the operator of the facility and the advertiser, the publisher providing the feed, or both.

In some embodiments, where the model web page does not contain adequate or appropriate rich media, the facility uses text associated with the model web page to automatically select stock photography images for inclusion in the advertising message generated by the facility. For example, the text used by the facility for this purpose may come from the web page to which the generated advertising message will be linked, a textual advertising message for this web page, or a web page that is related to this web page, or may be explicitly inputted by a user associated with the advertiser for which the facility is generating the advertising message. In some embodiments, the facility processes words and phrases indicated by this text to construct a query that the facility submits to a search engine provided by a stock photography image service. The facility then makes use of one or more of the images identified by the response to this query in generating the advertising message.

By automatically generating advertising messages in some or all of the ways described above, the facility enables a user without specialized expertise to quickly and straightforwardly generate an effective rich advertising message, making rich advertising messages available to a much wider population of advertisers.

FIG. 1 is a high-level data flow diagram showing data flow within a typical arrangement of components used to provide the facility. A number of web client computer systems 110 that are under user control generate and send page view requests 231 to one or more logical web servers 100 via a network such as the Internet 120. Within the web server, these requests may either all be routed to a single web server computer system, or may be loaded-balanced among a number of web server computer systems. The web server typically replies to each with a served page 132. Web servers 100 may include web servers operated by publishers of web pages that present advertising messages, are linked to from advertising messages, or both. Web servers 100 may also include one or more web servers implementing aspects of the facility.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions and associated video sources, cameras, etc.

Figure 2:
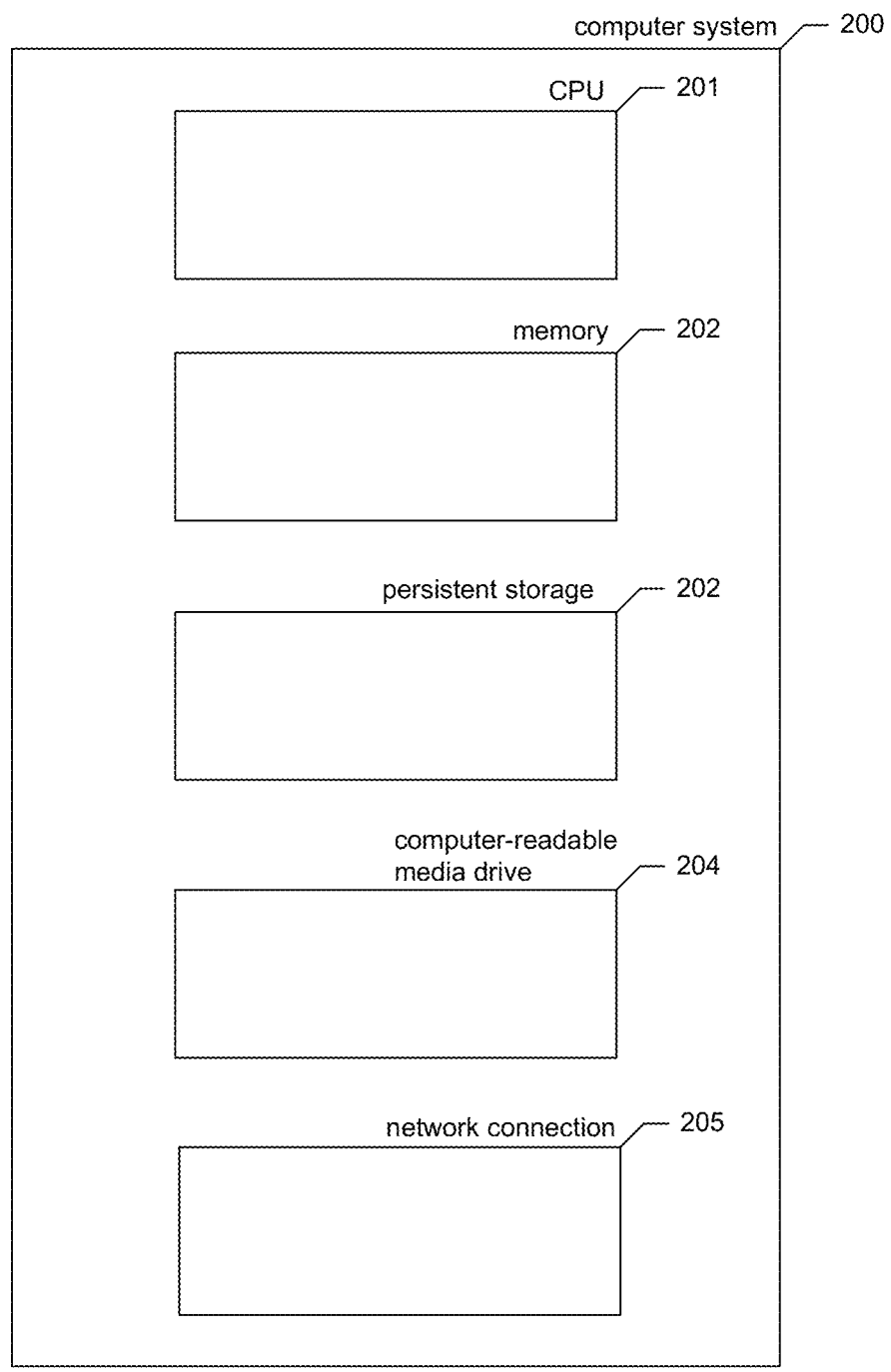
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
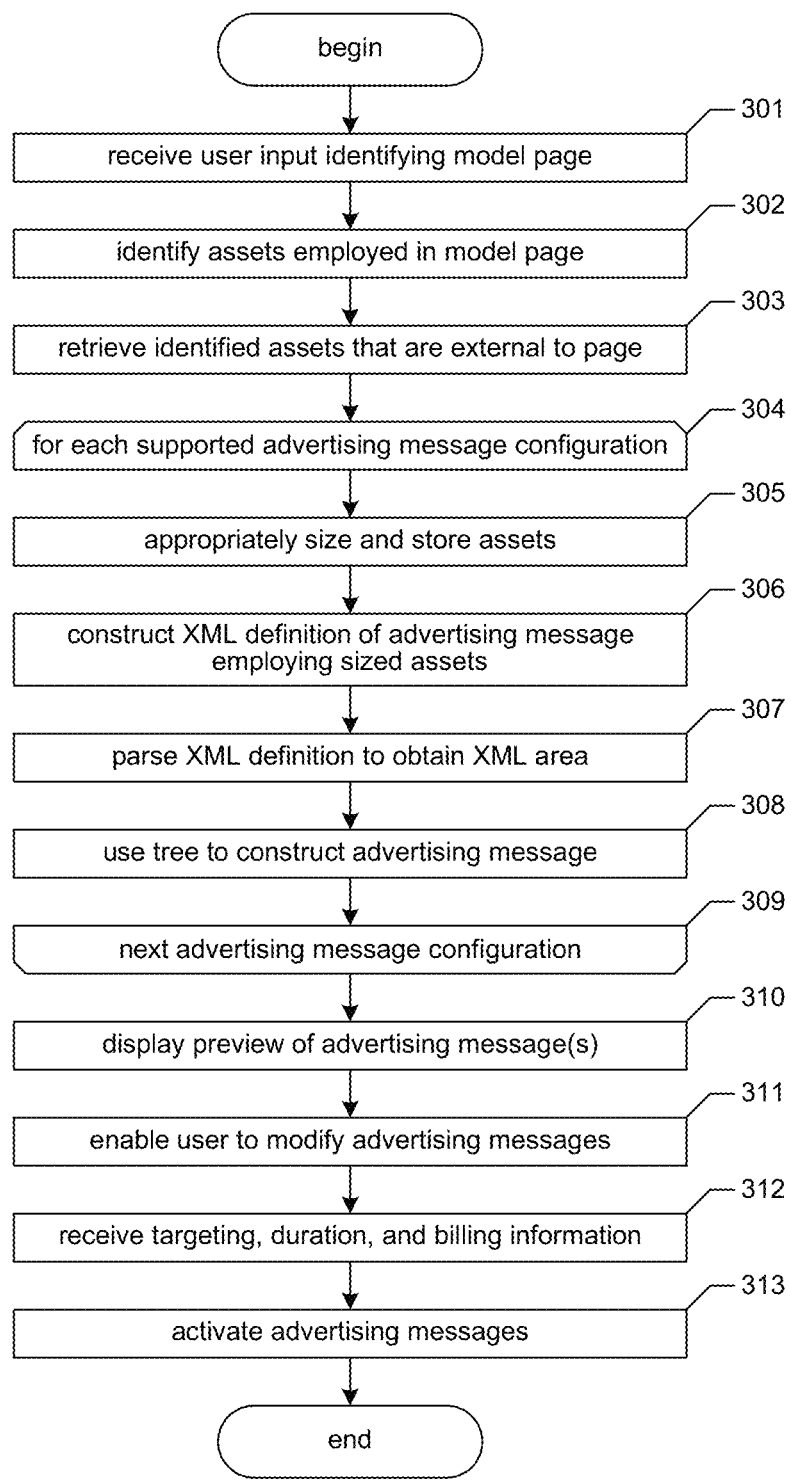
FIG. 3 is a flow diagram that shows steps typically performed by the facility in some embodiments in order to automatically generate one or more advertising messages.

FIG. 3 is a flow diagram that shows steps typically performed by the facility in some embodiments in order to automatically generate one or more advertising messages. In step 301, the facility receives user input identifying a model page upon which to base the generated advertising messages. The user input typically identifies the model page by specifying its URL, and can be received from the user in a variety of ways. In some embodiments, the facility serves a web page (not shown) to the user, and asks the user to type or paste the URL of the model page into a model page URL field. In some embodiments, the operator of the facility works with one or more publishers to cause an advertising message generation control to be incorporated in a number of different potential model pages.

Figure 4:
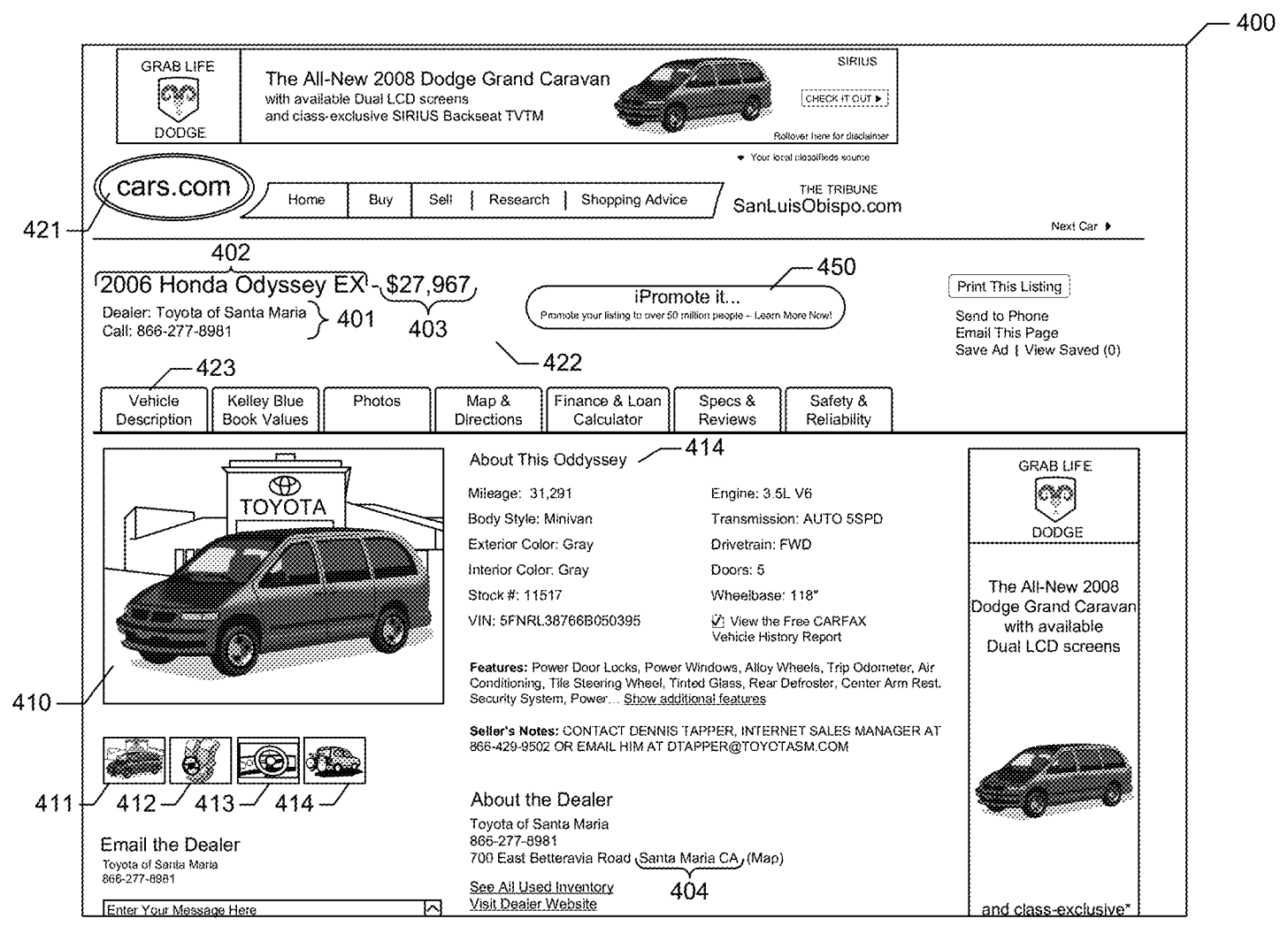

FIG. 4 is a display diagram showing a sample page containing a control that the user may activate in order to generate advertising messages based upon the sample page. The sample page 400 has a variety of contents, including the name 401 of an auto dealer selling a car; text 402 identifying the car; the listing price 403 for the car; and the city 404 in which the auto dealer is located. The model page also includes a number of thumbnail images 411-414, any of which the user can select to display at a larger size in space 410. The facility includes a number of colors, including the color of a logo 421, the color of the background 422, the color of the background of the selected tab 423, and the color of text such as text 414. In some embodiments, the extraction performed by the facility in step 301 extracts all of the above-discussed visual features. In a variety of embodiments, the facility extracts various other combinations of features contained by the page.

The page also contains control 450 that the user may activate in order to generate advertising messages for this page. In some embodiments, this control is included only in instances of the page served to a user who is the "owner" of the page, in this case a user associated with the auto dealer that is selling the car. In some embodiments, activation of this control causes the user's browser to send a request or other communication to a server on which aspects of the facility are executing. This communication contains the URL of the page, or some other basis for identifying the page such as a page ID.

Returning to FIG. 3, in step 302, the facility identifies assets employed in the model page, such as those described above in connection with FIG. 4. In some cases, this involves copying text, fonts, or colors that appear in the HTML code for the model page. In some cases, it involves copying references to external resources that are incorporated in the page, such as the URLs for each of the full-size versions of images 411-414, video or audio files, flash animations, etc. In some embodiments, the facility performs step 302 by retrieving a copy of the web page using its URL, and parsing the web page to extract tags, tag attributes, tag values, and other content expected to be relevant to the page.

Figure 5:
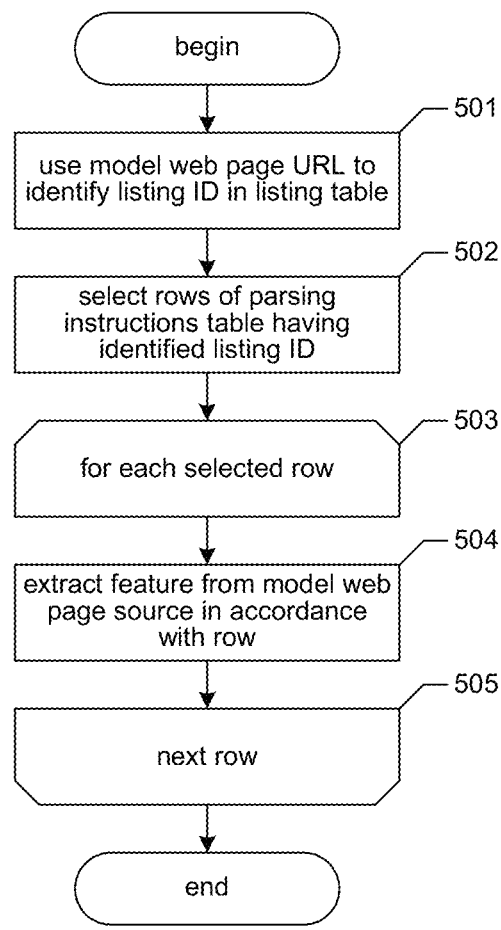
FIG. 5 is a flow diagram showing steps performed by the facility in some embodiments in order to identify assets employed in the model page.

FIG. 5 is a flow diagram showing steps performed by the facility in some embodiments in order to identify assets employed in the model page. In step 501, the facility uses the URL of the model web page to identify in the listing table a listing ID to which the model web page corresponds.

FIG. 6 is a table diagram showing sample contents of a listing table used by some embodiments of the facility to map from groups of model web pages to a listing ID specifying a set of parsing instructions to use to parse model web pages of the group. The listing table 600 is made up of rows, such as row 611, each corresponding to one of the groups of model web pages. Each row is divided into the following columns: a listing ID column 601; a target site column 602 identifying the domain of web pages in this group; a product category identifying the category of item that is described by the Web pages in this group; and a version number that indicates a particular version of parsing instructions constructed for this group of web pages. With respect to the sample model web page, the facility uses the listing table to determine that listing ID one should be used, based upon the URL of the model web page being in the cars.com domain, the model web page corresponding to product category 11 for automobiles, and version number 1 being the largest version for that combination of target site and product category in the listing table.

Returning to FIG. 5, in step 502, the facility selects the rows of the parsing instructions table having a listing ID identified in step 501.

FIG. 7 is a table diagram showing sample contents of a parsing instructions table used by the facility in some embodiments to specify a set of parsing instructions to use to parse a model web page. The parsing instructions table 700 is made up of rows, such as rows 711-719, each corresponding to the parsing instruction for one property to be extracted from the model web page. Each row is divided into the following columns: a listing ID column 701 in which the facility matches the listing ID identified in step 501; a property name column 702 specifying a name attributed to the feature to be extracted from the model web page; a count column 703 indicating the maximum number of matching features to extract from the model web page for the property; a container element column 704 specifying a type of tag to be matched for the property; a container class column 705 specifying a particular class of the container element to be matched; a container attribute column 706 specifying a particular attribute of the matching tag whose value is to be copied; a search expression column 707 specifying a regular expression to be matched by the copied text; and it and ignore case column 708 specifying whether the search expression in column 707 is to be treated as case insensitive. Typically, the rows of the parsing instructions table corresponding to a particular listing are generated by a human agent based upon a review of the HTML source for a sample of pages published by a publisher.

In steps 503-505, the facility loops through each row of the parsing instructions table selected in step 502. In step 504, the facility extracts one or more features from the HTML source for the model web page in accordance with the parsing instructions contained in the row. In step 505, if additional selected rows of the parsing instructions table remain to be processed, then the facility continues in step 503 to process the next selected row, else these steps conclude. In some embodiments (not shown), the facility similarly applies the parsing instructions to pages linked to from the model web page. In some embodiments, links are only followed for this purpose if they identify a URL in the same domain as the model web page. In some embodiments (not shown), the facility similarly applies the parsing instructions recursively in this manner, up to a predetermined maximum depth, such as three.

The application of the sample contents shown in the parsing instructions table 700 is discussed below in connection with the HTML source for the sample model web page shown below in Table 1.

TABLE 1

```
1.   <!DOCTYPE html PUBLIC "-//W3C//DTD XHTML 1.0 Transitional//EN"
2.   "http://www.w3.org/TR/xhtml1/DTD/xhtml1-transitional.dtd">
3.   <html xmlns="http://www.w3.org/1999/xhtml">
4.   <!-- Memberdata.zip='93401' -->
5.   <!-- end: _MemberPhone.jsp
6.   MemberPhone='866-277-8981'
7.   isTollFree='true'
8.   sessionScope.useTollFree='false'
9.   -->
10.  <head>
11.    <title> 2006 Honda Odyssey EX-L</title>
12.    <meta name="description" content=""/>
13.    <meta name="keywords" content=""/>
14.    <header_color val="0x562cab" />
15.    <background_color val="0xffffff"/>
16.    <title_font_color val="0xf5812c"/>
17.    <body_font_color val="0x888888"/>
18.    <img class="photo_1" name="tnImg0" id="tnImg0" src="http://images.cars.com/thumbnail/DMI/25289/11517.jpg" alt="" onerror="document.getElementById('tn0').style.display='none';"/>
19.    <img class="photo_2" name="tnImg1" id="tnImg1" src="http://images.cars.com/thumbnail/DMI/25289/11517.02.jpg" alt="" onerror="document.getElementById('tn1').style.display='none';"/>
20.    <img class="photo_3" name="tnImg2" id="tnImg2" src="http://images.cars.com/thumbnail/DMI/25289/11517.03.jpg" alt="" onerror="document.getElementById('tn2').style.display='none';"/>
21.    <h1>
22.    2006 Honda Odyssey EX-L - <span class="Price">$27,967</span><span id="mdFlag" class="nwListOn"></span>
23.    </h1>
24.    <span class="label">Member_Name</span> <span class="data">Toyota of Santa Maria</span>
25.    function clearValue(field) {
26.      if(field.value.indexOf("Enter Your Message Here") != -1){
27.        field.value = '';
28.        field.style.color = '#333333';
29.    <div id="aboutSellerBox" class="Dealer">
30.      <h2>About the Dealer</h2>
31.      <div id="sellerAddress">
32.        <div class="dataPoint">
33.    <span class="member_name">Toyota of Santa Maria</span>
34.        </div>
35.        <div class="dataPoint">
36.          <span class="phone">866-277-8981</span>
37.          <img src="http://a137.g.akamai.net/n/137/3538/20060217221024/www.cars.com/search/images/phone_Icon.gif"/>
38.        </div>
39.        <div class="address">
40.          <span class="Location">
41.            700 East Betteravia Road
42.            Santa Maria
43.            CA
44.          </span>
45.  </body>
46.  </html>
```

To process row 711 of the parsing instructions table, the facility searches the HTML source for the first-occurring span tag having the class member_name, which it finds in line 33. Because row 711 does not specify a particular attribute of the span tag whose value is to be copied, the facility copies the content of the tag, "Toyota of Santa Maria." To process row 712 of the parsing instructions table, the facility searches the HTML source for the first-occurring title tag, which it finds in line 11. The facility copies the content of the tag, "2006 Conduct Odyssey EX-L." To process row 713, the facility searches for the first-occurring span tag having the class location, which it finds in line 40. In accordance with the search expression specified in row 713, the facility copies the text between the first and second new-line character in the content of the tag, i.e., "Santa Maria." To process row 714, the facility searches for the first-occurring span tag having the class price which it finds in line 22, and copies the content of the tag, "$27,967." To process row 715, the facility searches for the first-occurring three img tags whose src attribute has a value matching the search expression specified in row 715. These occurrences are in lines 18, 19, and 20, from each of which the facility copies the URL text. To process row 716, the facility searches for the first-occurring header color tag which it finds in line 14, and copies the value of the val attribute, "0x562cab." To process row 717, the facility searches for the first-occurring background_color tag which it finds in line 15, and copies the value of the val attribute, "0xffffff." To process row 718, the facility searches for the first-occurring title_font_color tag which it finds in line 16, and copies the value of the val attribute, "0xf5812c." To process row 719, the facility searches for the first-occurring body_font_color tag which it finds in line 17, and copies the value of the val attribute, "0x888888."

In various embodiments, the facility uses a wide variety of regular expression schemes to specify the search expressions contained in column 707, including but not limited to those used by the Microsoft Visual Basic scripting language and the PHP hypertext processor. In some embodiments, the grammar used by the facility has one or more of the following characteristics:

Vertical Bar, |, is used to separate alternatives. For example, http://|https://can match "http://" or "https://".

Parentheses are used to define the scope and precedence of operators. For example, gray|grey and gr(a|e)y are equivalent patterns which both describe the set of "gray" and "grey".

The ^ character, contained in brackets [ ] means "not". In these examples, [^"] means, "match all characters that are NOT a double quote".

A quantifier after a token (such as a character) or group specifies how often that preceding element is allowed to occur.

The question mark quantifier indicates there is zero or one of the preceding element. For example, colou?r matches both "color" and "colour".

The asterisk quantifier indicates there are zero or more of the preceding element. For example, ab*c matches "ac", "abc", "abbc", "abbbc", and so on.

The plus-sign quantifier indicates that one or more of the elements preceding it must exist. In these examples, [^"]+ means that there must exist one or more characters in this spot that is not the double-quote character.

Additional examples of search expression pattern matching follow. The examples assume that the HTML source for the model web page is that shown below in Table 2.

TABLE 2

1. <img src="http://www.images.com/images/user/small/4773237b783nxgh34.jpg">
2. <img src="http://www.images.com/images/user/small/4773237b783nxgh34.gif">
3. <img src="http://www.images.com/images/user/medium/94987348745.jpg">
4. <img src="https://www.images.com/images/user/medium/aksdfuISJSIVK.gif">
5. <img src="https://www.images.com/images/user/large/aksdfuISJSIVK.jpg">
6. <img src="https://www.images.com/images/user/large/IskvisIjghi83248498.gif A first example is a search expression that returns only .jpg images of any size:

(http://|https://)www.images.com/images/user/(small|medium|large)/[^"]+.jpg

This search expression returns the URLs in lines 1, 3, and 5. A second example is a search expression that returns only medium-sized .jpg images:

(http://|https://)www.images.com/images/user/mediume/[^"]+.jpg

This search expression returns the URL in line 3. A third example is a search expression that returns only non-secure (http) .jpg and .gif images of any size:

(http://www.images.com/images/user/(small|medium|large)/[^"]+.(jpg|gif)

This search expression returns the URLs in lines 1, 2, and 3.

In some embodiments, the operator of the facility makes arrangements with one or more web publishers under which the web publishers make available a direct interface that may be called by the facility to directly retrieve information about the assets employed in any page published by the publisher. In such embodiments, step 302 involves sending a request to the publisher's interface that identifies the model page, such as by providing a URL or page ID for the page. The publisher responds with a response expressly identifying the assets to be incorporated in the generated advertising message that makes it unnecessary to parse the HTML source for the model page in order to obtain this information.

In some embodiments, the publisher includes source for the advertising message generation control in the model web page that, when the control is activated, causes the browser to post to a server executing portions of the facility information identifying the assets to be incorporated in the generated advertising message. Here too, it is unnecessary for the facility to parse the HTML source for the model page in order to obtain this information.

As one example, Tables 3-6 below show an example of source for the advertising message generation control in the model web page that, when the control is activated, causes the browser to post to a server executing portions of the facility information identifying the assets to be incorporated in the generated advertising message. Table 3 below shows sample source included in the model web page that defines an "ipromote_widget" class for containing the information identifying the assets to be incorporated in the generated advertising message.

TABLE 3

1. <div class="ipromote_widget">
2. <script type="text/javascript">
3. var promotion = {
4. title: 'Web Page Title',
5. url: 'http://yourdomain.com/page.html',
6. description: This is an example description summarizing the page',
7. photo1: 'http://yourdomain.com/images/image1.jpg',
8. photo2: 'http://yourdomain.com/images/image2.jpg',
9. photo3: 'http://yourdomain.com/images/image3.jpg',
10. headerColor: '77ff39', TABLE 3-continued

```
11.          backgroundColor: '000000',
12.          titleFontColor: '2266ff',
13.          bodyFontColor: 'ff4499',
14.          imageHeader: 'http://yourdomain.com/images/mylogo.jpg',
15.          textHeader: 'My Company'
16.        };
17.        var widget = {
18.          buttonhtml: '<div id="ipromote_it"><a href="javascript:void(0)"><img
             src="http://ipromote.com/imagedir/
             layout/promoteit_small.png" /></a></div>',
19.          buttonid: 'ipromote_it'
20.        };
21.     </script>
22.     <script type="text/javascript"
23.       src="http://ipromote.com/widget12/ipromoteit.php?partnerToken=00000-000-000-0000
24.       &uniqueID=11111&position=bottomRight&wid=1">
25.     </script>
26.   </div>
```

Table 4 below contains descriptions of the components of the promotion variable defined by the ipromote_widget class in lines 3-16 of Table 3 that actually contain the information identifying assets to be incorporated in the generated advertising message. In various embodiments, the facility supports various variations of the shown list of components, including lists that include only some of the shown components, lists that include components not shown, lists that rename or otherwise reconfigure shown components, etc.

TABLE 4

| component | Description |
| --- | --- |
| title: | (optional) [utf-8 String] - The title of the promotion to be displayed within the ads and reporting screens; defaults to document.title |
| url: | (optional) [fully qualified URL] - The URL of the page that is being promoted *must include http://; defaults to document.location |
| description: | (optional) [utf-8 String] - A Short description of the page that may be displayed within the ads; defaults to first 200 characters in <body> tag |
| photoX: | (optional) [fully qualified URL] - Images that will be show within the ads. You can specify as many images as you like (.jpg, .gif, .png). Use high resolution images for best results. Syntax is as follows: photo1: 'http://yourdomain.com/images/image1.jpg', photo3: 'http://yourdomain.com/images/image3.jpg', photo2: 'http://yourdomain.com/images/image2.jpg', . . . |
| headerColor: | (optional) [utf-8 String] - Header color to be used in the ads; defaults to your user's page header color |
| backgroundColor: | (optional) [utf-8 String] - Background color to be used in the ads; defaults to your user's page background color |
| titleFontColor: | (optional) [utf-8 String] - Title font color to be used in the ads; defaults to your user's page title font color |
| bodyFontColor: | (optional) [utf-8 String] - Font color to be used in the ads; defaults to your user's page font color |
| imageHeader: | (optional) [fully qualified URL] - Image to use in the Ad header (usually a logo) |
| textHeader: | (optional) [utf-8 String] - Text to use in the Ad Header |

Table 5 below contains descriptions of the components of the widget variable defined by the ipromote_widget class in lines 17-20 of Table 3 that specify how to generate the appearance of the control, also called the button. In various embodiments, the facility supports various variations of the shown list of components.

TABLE 5

| component | Description |
|---|---|
| buttonhtml: | HTML for drawing widget button |
| buttonid: | identification for widget button |

Table 6 below shows descriptions of the parameters for the widget script shown in lines 22-25 of Table 3.

TABLE 6

| parameter | description |
|---|---|
| partnerToken: | (required) [utf-8 String] - The partner token given to you by iPromote when you first signed up |
| uniqueID: | (suggested) [utf-8 String] - A unique id for this page or this user that assists the system in tracking. Ensures the system can properly deliver stats for this promotion (i.e. Ads Served, Clicks, etc.) |
| position: | (optional) [utf-8 String] - The orientation of the widget popup in relation to the button. Allowed values: [bottom Right, bottom Left, topRight, topLeft, inLine] |
| wid: | (suggested) [utf-8 String] - A unique id for each widget and its corresponding button on this page |

Figure 8:
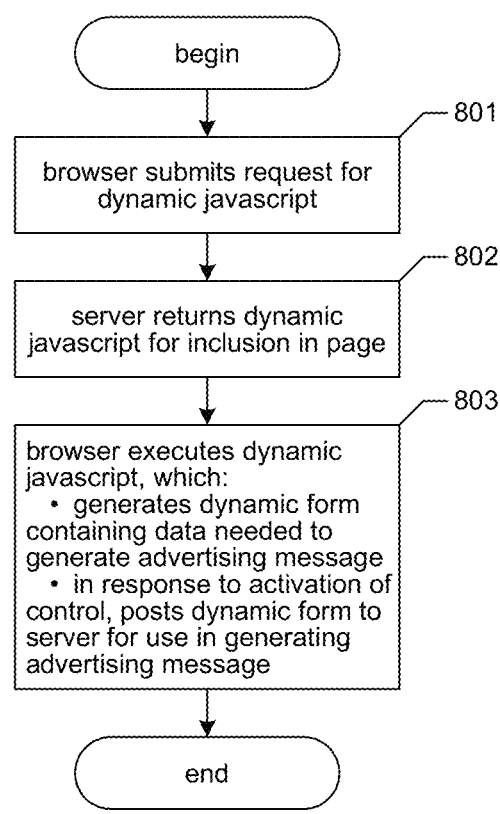
FIG. 8 is a flow diagram showing steps typically performed by the facility in some embodiments when a page contains source for an advertising message generation control that causes a form containing data that is needed or useful to generate an advertising message for the subject page to be posted to a server on which the facility is executing.

FIG. 8 is a flow diagram showing steps typically performed by the facility in some embodiments when a page contains source for the advertising message generation control similar to that shown in Table 3. In step 801, the browser submits a request for dynamic javascript to a web server, such as a request in accordance with lines 22-25 of Table 3. In step 802, that server returns the requested dynamic javascript for inclusion in the page, where it replaces the script tag that generated the request. In step 803, the browser executes the dynamic javascript. As a first matter, the dynamic javascript generates a dynamic form containing data from the page that is needed or useful to generate an advertising message for the subject page. The executing dynamic javascript further, in response to activation of the control, posts the generated dynamic form to a server for use in generating an advertising message. After step 803, the steps conclude.

Table 7 below shows a sample form that is generated and posted by the dynamic javascript in accordance with the example page shown in Table 3.

TABLE 7

| field | value |
|---|---|
| partnerToken: | 00000-000-000-0000 |
| uniqueID: | 11111 |
| position: | bottom Right |
| wid: | 1 |
| title: | 'Web Page Title' |
| url: | 'http://yourdomain.com/page.html' |
| description: | 'This is an example description summarizing the page' |
| photo1: | 'http://yourdomain.com/images/image1.jpg' |
| photo2: | 'http://yourdomain.com/images/image2.jpg' |
| photo3: | 'http://yourdomain.com/images/image3.jpg' |
| headerColor: | '77ff39' |
| backgroundColor: | '000000' |
| titleFontColor: | '2266ff' |
| bodyFontColor: | 'ff4499' |
| imageHeader: | 'http://yourdomain.com/images/mylogo.jpg' |
| textHeader: | 'My Company' |
| buttonhtml: | '<div id="ipromote_it"><a href="javascript:void(0)"><img src="http://ipromote.com/imagedir/layout/promoteit_small.png" /></a></div>' |
| buttonid: | 'ipromote_it' |

In some embodiments, the facility permits the publisher to include multiple controls in the model web page, each of which causes a different advertising message to be generated for the model web page, as shown below in Table 8.

TABLE 8

```
1.   <!--START iPromote Widget Snippet #1-->
2.   <div class="ipromote_widget">
3.     <script type="text/javascript">
4.     var promotion = {
5.     ....
6.     };
7.     var widget = {
8.       buttonhtml: '<div id="ipromoteit_1"><a href="javascript:void(0)"><img
9.         src="http://ipromote.com/imagedir/
10.        layout/promoteit_small.png" /></a></div>',
11.      buttonid: 'ipromoteit_1'
12.    };
13.    </script>
14.    <script type="text/javascript"
15.    src="http://ipromote.com/widget12/ipromoteit.php?partnerToken=00000-000-000-0000
16.    &uniqueID=11111&position=bottomRight&wid=1">
17.    </script>
18.  </div>
19.  <!--END iPromote Widget Snippet #1-->
20.  <!--START iPromote Widget Snippet #2-->
21.  <div class="ipromote_widget">
22.    <script type="text/javascript">
23.    var promation = {
24.    ...
25.    },
26.    var widget = {
27.      buttonhtml: '<div id="ipromoteit_2"><a href="javascript:void(0)"><img
28.        src="http://ipromote.com/imagedir/
29.        layout/promoteit_small.png"/></a></div>';
30.      buttonid: 'ipromoteit_2'
31.    };
32.    </script>
33.    <script type="text/javascript"
34.    src="http://ipromote.com/widget12/ipromoteit.php?partnerToken=00000-000-000-0000
35.    &uniqueID=11111&position=bottomRight&wid=2">
36.    </script>
37.  </div>
38.  <!--END iPromote Widget Snippet #2-->
```

Each of the controls is uniquely identified by a different value of the wid parameter, as shown in lines 16 and 35 of Table 8, and a different value of the buttonid component of the widget variable, as shown in lines 11 and 30 of Table 8.

Returning to FIG. 3, in step 303, the facility retrieves assets identified in step 302 that are external to the page, such as images, video and audio streams, animations, etc.

In some embodiments, the facility generates multiple different advertising messages in response to each user request. These different advertising messages, referred to as "advertising message configurations," can correspond to various advertising message dimensions, media types, maximum or target data sizes and/or data rates, etc. For example, the Interactive Advertising Bureau provides specifications for different standard advertising message types, such as at www.iab.net/iab_products_and_industry_services/1421/1443/1473/81563 and www.iab.net/iab_products_and_industry_services/1421/1443/1452. Those skilled in the art will appreciate that various other advertising message configurations may be supported by the facility.

In step 304-309, the facility loops through each of the advertising message configurations it supports. In step 305, the facility appropriately sizes and stores copies of assets identified in step 302 in a manner appropriate for the dimensions and other attributes of the current advertising message configuration. For text assets, this may include cropping the text and/or changing or setting its size. For images, video streams, etc., this can involve cropping, zooming, panning, etc. In step 306, the facility constructs an XML definition of the advertising message employing the assets as sized in step 305. A sample XML definition is shown below in Table 9 that corresponds to the HTML source shown in Table 1.

TABLE 9

```
1.   <?xml version="1.0" encoding="utf-8" ?>
2.   <MediaPackage>
3.   <Properties>
4.   <LogoText>Toyota of Santa Maria</LogoText>
5.   <DarkForeground>1</DarkForeground>
6.   <DarkBackground>1</DarkBackground>
7.   <Title>2006 Honda Odyssey EX-L</Title>
8.   <Description/>
9.   <Category>11</Category>
10.  <Location>Santa Maria</Location>
```

TABLE 9-continued

11. <Price>$27,967.00</Price>
12. <LogoImage></LogoImage>
13. <ImageCount>3</ImageCount>
14. <Image_1>http://images.cars.com/main/DMI/25289/11517.jpg</Image_1>
15. <Image_2>http://images.cars.com/main/DMI/25289/11517.02.jpg</Image_2>
16. <Image_3>http://images.cars.com/main/DMI/25289/11517.03.jpg</Image_3>
17. <Condition></Condition>
18. <HeaderColor>562cab</HeaderColor>
19. <BackgroundColor>ffffff</BackgroundColor>
20. <TitleFontColor>f5812c</TitleFontColor>
21. <BodyFontColor>888888</BodyFontColor>
22. <PromotionURL>
23. http://www.cars.com/go/search/detail.jsp;?tracktype=usedcc&searchType=21&pageNumber=0
    &numResultsPerPage=50&largeNumResultsPerPage=0&sortorder=descending&
    sortfield=PRICE+descending&certifiedOnly=false&criteria=K-%7CE-%7CM-_18_%7CD-
    _215_%7CN-N%7CR-30%7CI-1%7CP-PRICE+descending%7CQ-descending%7CZ-
    93401&aff=national&paId=250149140&recnum=0&leadExists=true
24. </PromotionURL>
25. </Properties>
26. </MediaPackage>

The dealer name extracted from line 24 of Table 1 is included on line 4 of Table 9. The title text extracted from line 11 of Table 1 is included at line 7 of Table 9. The dealer location extracted from line 42 of Table 1 is included at line 10 of Table 9. The price extracted from line 22 of Table 1 is included at line 11 of Table 9. The image URLs extracted from lines 18-20 of Table 1 are included at lines 14-16 of Table 9. The color values extracted from lines 14-17 of Table 1 are included at lines 18-21 of Table 9. In step 307, the facility parses the XML definition constructed in step 306 to obtain an XML tree. In step 308, the facility uses the tree obtained in step 307 to construct the advertising message. In some embodiments, in step 306, the facility constructs a Macromedia Flash file having the ".swf" file name extension. The constructed Flash file contains a reference to the XML tree that causes an action receipt included in the Flash file to load the XML tree and use it as a basis for presenting the advertising message. In some embodiments, the facility includes in the generated advertising message a link that viewers of the advertising message can activate to display the model web page, or another web page specified by the user. In step 309, if additional advertising message configurations remain to be processed, then the facility continues in step 304 to process the next advertising message configuration, else the facility continues in step 310.

In step 310, the facility displays a preview of one or more of the generated advertising messages. In step 311, the facility enables the user to modify the generated advertising messages.

Figure 9:
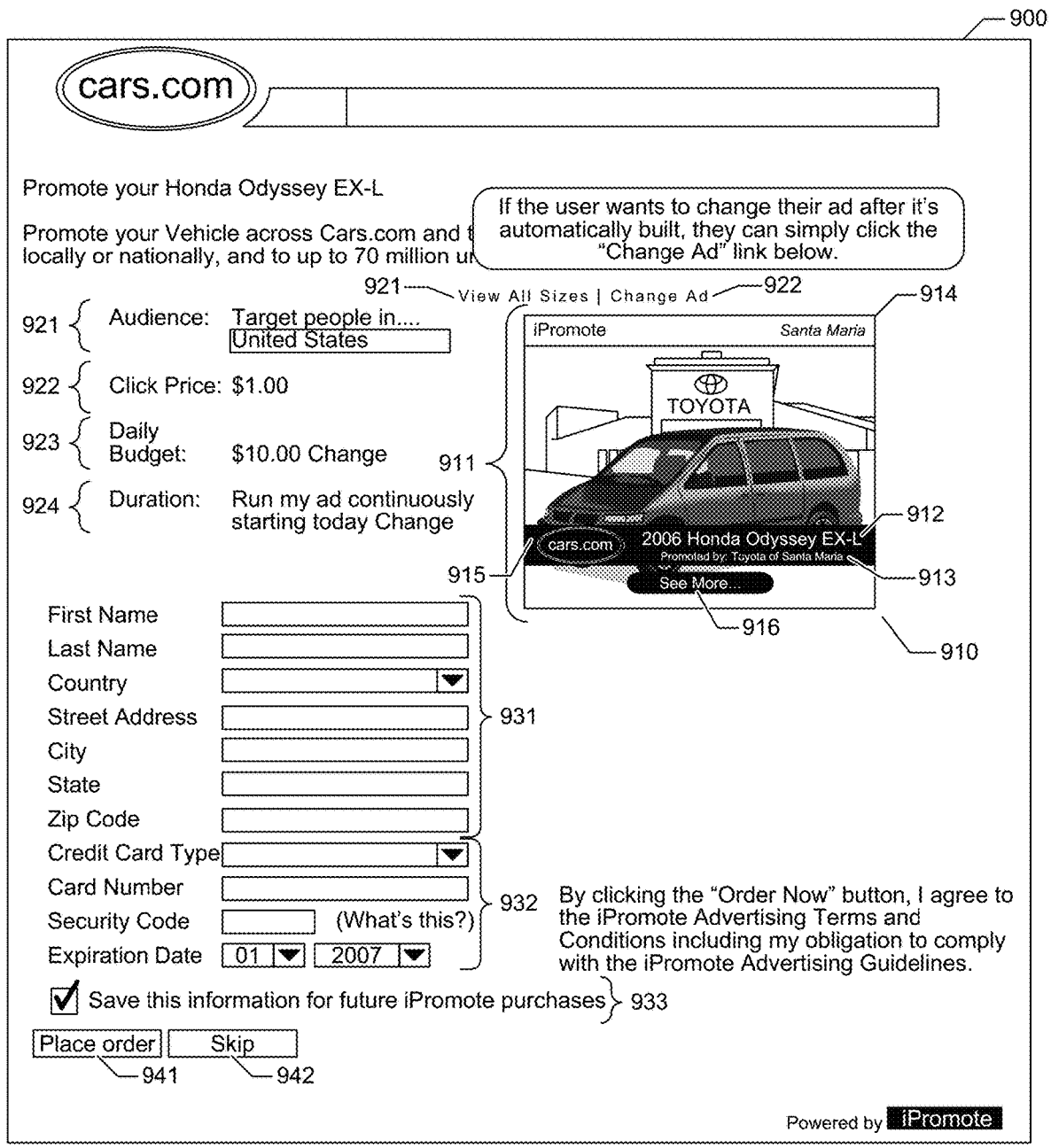
FIG. 9 is a display diagram showing a sample preview display presented by the facility.

FIG. 9 is a display diagram showing a sample preview display presented by the facility. The display 900 includes a preview of one of the advertising messages generated for the model page shown in FIG. 4. The advertising message preview 910 includes elements from the model page, including an image 811 cropped from image 410 and/or image 411 shown in the model page, text 912 identifying the car, text 913 identifying the auto dealer, text 914 identifying the location of the auto dealer, and logo 915 for the publisher web site. The advertising message preview further includes a control 916 for traversing a link to the model web page. The advertising message preview further incorporates colors and/or fonts from the model page.

The page further includes a control 921 that the user can activate in order to display the different advertising messages generated by the facility for the different advertising message configurations. The display also includes a control 922 that the user can activate in order to modify the generated advertising message or advertising messages.

Figure 10:
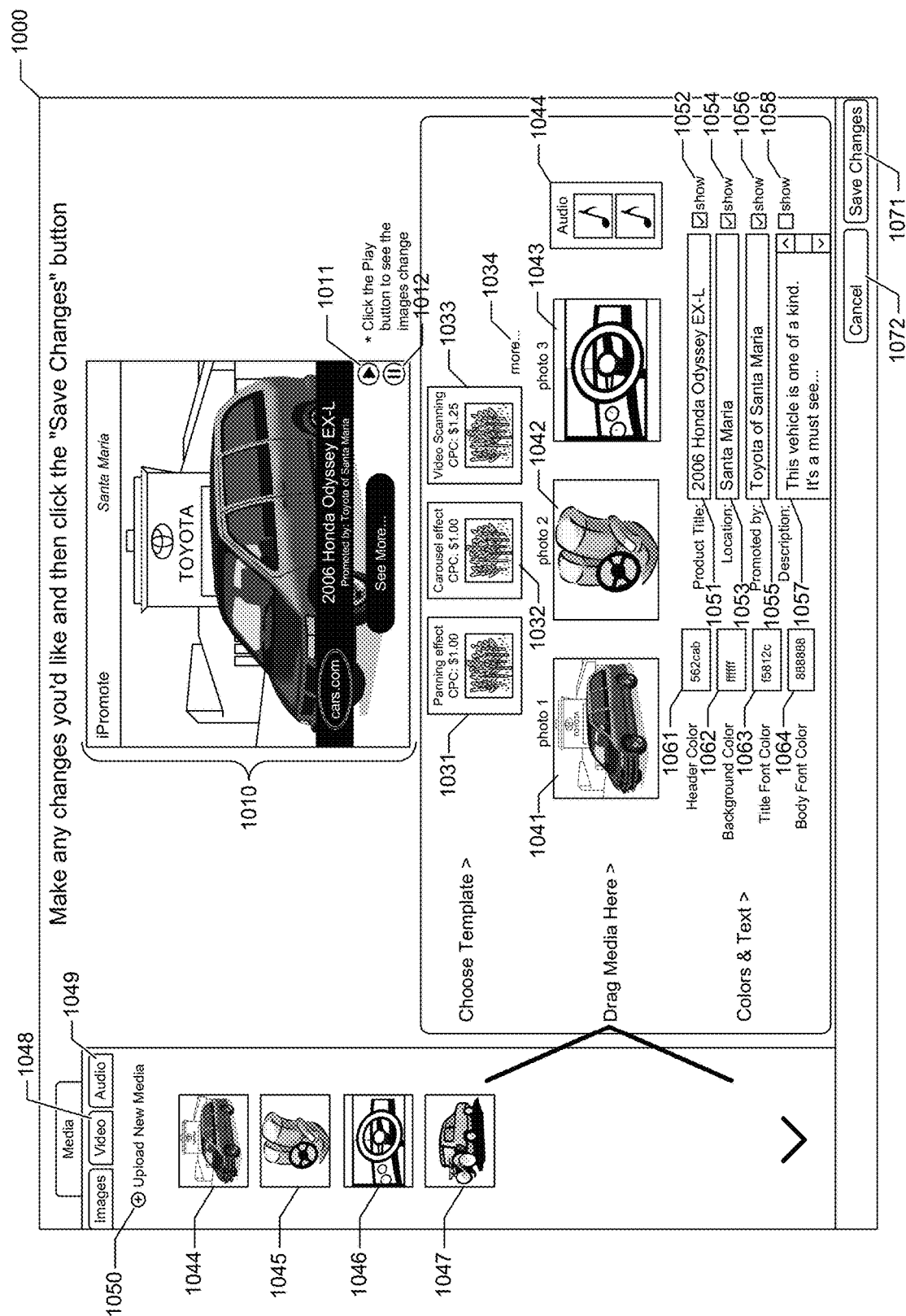
FIG. 10 is a display diagram showing a typical display presented by the facility to enable the user to modify advertising messages generated by the facility.

FIG. 10 is a display diagram showing a typical display presented by the facility when the user activates the change advertising message control shown in FIG. 9. The user interface presents a copy 1010 of the generated advertising message. The advertising message is accompanied by play and pause controls 1011 and 1012, respectively, that the user can use to play and pause time-index materials associated with the advertising message, such as image slide shows, video/audio sequences, animations, etc. Panel 1020 represents different types of modifications that the user may make to the advertising message. The user may select any of controls 1031-1034 to select different visual effects to be applied to the advertising message, including panning, image carousel, video scanning, etc. The user may also drag to spaces 1041-1043 any images that the user wishes to have incorporated in the advertising message. The user may drag to these spots any of the images 1044-1047 shown on the left side of the display. The user may also select tab 1048 in order to display video clips that can be dragged to the spots for inclusion in the advertising message, or tab 1049 to display audio clips that can be included in the advertising message by dragging them to an audio spot 1044. Further, the user can activate control 1050 in order to directly upload media of virtually any type for inclusion in the advertising message. The display further includes text fields 1051, 1053, 1055, and 1057 whose contents the user may edit for inclusion in the advertising message. Each text field is accompanied by a show check box 1052, 1054, 1056, and 1058 that the user may check or uncheck to determine whether the corresponding text will appear in the advertising message. The display further includes four colors 1061-1064 used in the advertising message. The user may select any of those in order to change it. In some embodiments, the user can type a new color value after selecting one of the colors. In some embodiments, when the user selects a color, the facility presents a color picker user interface that the user may navigate in order to select a new color value for the selected color (not shown). After the user has made desired modifications, the user selects a save changes control 1071. If the user wishes to revert to the originally-generated advertising message, the user can select the cancel control 1072 to return to the display shown in FIG. 9 without making any changes.

Returning to FIG. 3, in step 312, the facility receives information from the user about targeting the advertising message, specifying its duration, and providing billing information. In step 313, the facility activates the advertising messages in accordance with the information specified by the user. After step 313, these steps conclude.

Those skilled in the art will appreciate that the steps shown in FIG. 3 may be altered in a variety of ways. For example, the order of the steps may be rearranged; substeps may be performed in parallel; shown steps may be omitted, or other steps may be included; etc.

Returning to FIG. 9, the display 900 includes a control 921 usable by the user to specify a geographic region to which the advertising message is to be targeted. In various embodiments (not shown), the facility permits the user to specify a variety of other types of targeting, including behavioral targeting, profile-based targeting, and specific publisher or publisher group targeting. The display also contains an indication 922 of the cost to the advertiser each time a user clicks through the generated advertising message. The display further includes a control 923 that the user may use in order to specify a daily budget for the advertising message. Typically, when the daily budget is reached during a particular day, the advertising message is not presented again until the next day. The display also includes a control 924 that the user can use to specify a duration for presenting the advertising message. The display also includes controls for specifying billing information used to pay for presenting the advertising message, including address information 931, credit card information 932, and an indication 933 of whether the billing information should be saved as a basis for presenting future advertising messages. After the user is satisfied with the information that the user has specified in connection with the generated advertising message, the user selects control 941 in order to activate the advertising message. If the user has decided against activating the advertising message, the user can select a skip control 942.

In some embodiments, the facility provides a mechanism for the user to download the generated and/or modified advertising messages and associated resources. In some embodiments, the facility provides a mechanism for providing the generated and/or modified advertising messages directly from the facility to a third-party advertising agency or ad serving service provider.

Figure 11:
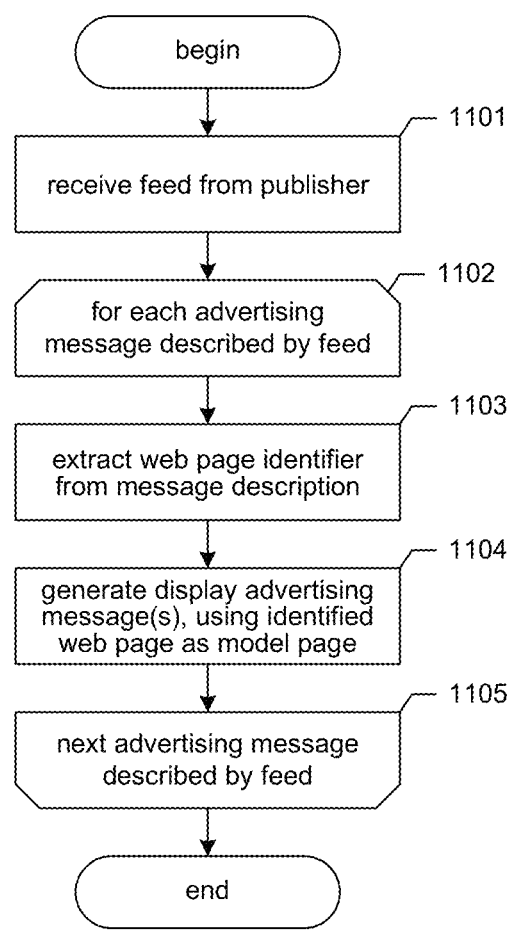
FIG. 11 is a flow diagram showing steps typically performed by the facility in order to generate display advertising messages based upon a textual advertising message feed received from a publisher.

FIG. 11 is a flow diagram showing steps typically performed by the facility in order to generate display advertising messages based upon a textual advertising message feed received from a publisher. In some embodiments, these steps are performed by the facility periodically, such as once per day.

In step 1101, the facility receives the feed from the publisher or other source providing the feed. In some embodiments, the feed is autonomously published by the publisher and passively received by the facility. In some embodiments, the facility actively retrieves the feed from the publisher, either periodically or when needed.

In steps 1102-1105, the facility loops through each textual advertising message described by the feed received in step 1101. In step 1103, the facility extracts a web page identifier from the message description. In various embodiments, the web page identifier is a URL that may be used to retrieve the web page; or a non-URL web page identifier that has been associated with a web page by its publisher, and that may be passed to the publisher via a direct interface as part of a request that the publisher explicitly identify assets to be included in the advertising message. In step 1104, the facility automatically generates one or more display advertising messages corresponding to the described message as discussed above in connection with FIG. 3, using the web page whose identifier was extracted in step 1103 as the model page. Depending on the nature of the web page identifier extracted in step 1103, in various embodiments step 1104 involves making an HTTP request for the identified page, making a request of the publisher via its direct interface for assets of the identified page, extracting information identifying assets from the feed describing advertising messages, or extracting information identifying assets from a separate feed provided by the same or different source.

In some embodiments, as part of step 1104, the facility determines whether the identified web page contains a link or other reference to a different web page that is more likely than the identified web page to contain assets that provide a better basis for generating an effective display advertising message and, if so, uses the other web page rather than the identified web page as the model page. For example, in some embodiments, where the identified web page is a business profile page on a local business directory website that contains a link to the profiled business's home page, the facility uses the profiled business's homepage as the model page when automatically generating display advertising messages.

Figure 12:
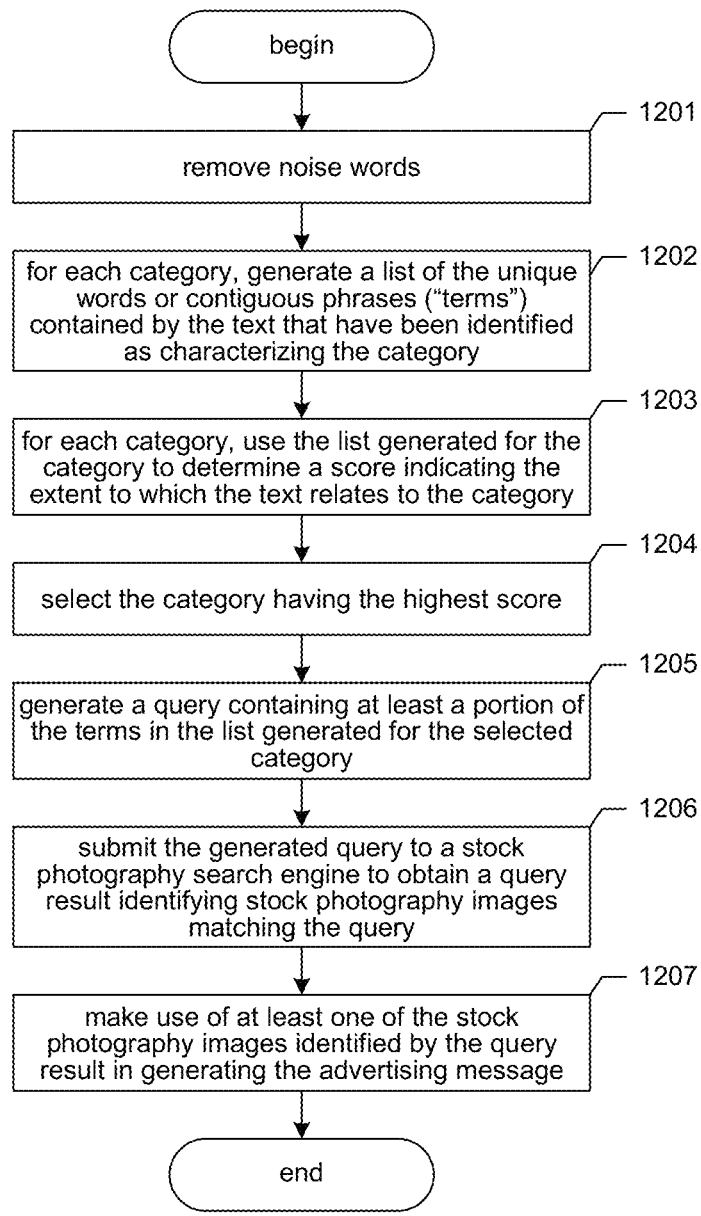
FIG. 12 is a flow diagram showing steps typically performed by the facility in order to automatically select one or more stock photography images based upon text associated with the model web page.

In some embodiments, as part of step 1104, the facility automatically selects one or more stock photography images as a basis for generating a display advertising message using text associated with the identified web page. For example, in various embodiments, the facility retrieves such text from the identified web page and/or a related web page, such as a web page to which the identified web page contains a link or other reference; retrieves such text from a textual advertising message for the web page; and/or explicitly solicits the text from a user associated with the advertiser. In some embodiments, text retrieved by the facility from a web page includes tag text, meta-tag text, and keywords of the web page. In some embodiments, the facility performs this automatic selection of stock photography images where the identified web page and related web page contain an inadequate number of assets—such as zero, or an inadequate number of assets—such as zero—determined to be of sufficient quality, such as based upon the format of the asset (e.g., JPG versus GIF), the dimensions of the assets, etc. FIG. 12, discussed below, shows additional details of the process of automatically selecting stock photography images.

In step 1105, if additional advertising messages described by the feed remain to be processed, then the facility continues in step 1102 to process the next advertising message described by the feed, else these steps conclude.

In some embodiments, the facility provides the display advertising messages generated based upon a feed received from a publisher to the publisher, such as in a feed directed to the publisher. The publisher may sell a placement for the generated display advertising messages to the advertiser, or may immediately place them based upon an existing agreement with the advertiser.

In some embodiments, the operator of the facility sells a placement for the generated display advertising messages to the advertiser. In various embodiments, the facility establishes the details of this placement—such as price, periodic budget, and geographic region—based upon information contained in the feed or otherwise received from the publisher about the advertiser's textual advertising message placement, information solicited from the advertiser, or both.

Table 10 below shows example contents of a typical entry in a sample textual advertising message feed.

TABLE 10

| | |
|---|---|
| 1. | link: http://seattle.citysearch.com/profile/10776759 |
| 2. | text: Enjoy delicious Pakistani and Indian Curry at Café Zum Zum in downtown Seattle! |
| 3. | keywords: curry, lunch |
| 4. | price: $.03/click |
| 5. | budget: $50/month |
| 6. | geographic region: pacnw |

When the facility encounters this entry in performing the steps of FIG. 11, it examines the contents of the business profile page at the URL contained in line 1. If that page contains a link to the profiled business's home page, then the facility generates a display ad using the assets on the linked-to home page. Otherwise, the facility generates a display ad using the assets on the business profile page at the URL contained in line 1. In some embodiments, the facility goes on to automatically create an advertising placement for the generated display advertising message using the information contained in lines 4-6 about the advertiser's textual advertising message placement. For example, based upon the information contained in lines 4-6, the facility may create a display placement for $.06/click, $25/month, in the pacnw region.

FIG. 12 is a flow diagram showing steps typically performed by the facility in order to automatically select one or more stock photography images based upon text associated with the model web page. In step 1201, the facility removes noise words from the text, such as articles, pronouns, etc. In step 1202, for each of a number of different subject matter categories, the facility generates a list of the words or contiguous phrases contained by the text that are each identified as characterizing the category. These words and phrases are referred to herein as "terms." In some embodiments, the facility uses a category matching table to perform step 1202.

FIG. 13 is a table diagram showing sample contents of a category matching table that identifies words and/or phrases that characterize subject matter categories. The table is comprised of rows, such as rows 1311-1319. Those skilled in the art will appreciate that, while only a limited number of rows are shown in FIG. 13 for the sake of readability, in various embodiments, the category matching table can contain a large number of rows, such as hundreds, thousands, tens of thousands, or hundreds of thousands of rows. Each row is divided into the following columns: a category column 1301, a term column 1302, and a weight column 1303. Each row indicates that the word or phrase in column 1302 characterizes the category in column 1301 with the weight or level of certainty in column 1303. For example, row 1312 indicates that the word "server" characterizes the "Food & Dining" category with the weight of 0.12, while row 1313 indicates that the phrase "food server" characterizes the "Food & Dining" category with the weight of 0.44. In various embodiments, a variety of approaches are used to obtain the category matching table, such as constructing the table under the control of human editors; automatically constructing the table by automatic analysis of text, such as automatically determining the simple frequency or inverse document frequency of web pages or other documents to which categories have been applied; procuring the table from an external source; etc.

In some embodiments, the facility performs step 1202 by, for each category, selecting the rows of the category matching table that contain the category in category column 1301 and contain a word or phrase present in the text in word/phrase column 1302. In some embodiments, where the facility selects a first row whose word or phrase is wholly contained in the word or phrase of a second selected row, the facility deselects the first row unless the text at some point contains the word or phrase of the first row without containing the word or phrase of the second row. In some embodiments, where a row's word or phrase is not present in the text, but matches a portion of the text when the word or phrase of the row and the words in the portion of the text are stemmed, the row is selected. In some embodiments, where a row's word or phrase is not present in the text, but a synonym of the row's word or phrase identified by a thesaurus is present in the text, the row is selected.

In step 1203, for each category, the facility uses the list generated for the category in step 1202 to determine a score indicating the extent to which the text relates to the category. In some embodiments, the facility performs step 1203 as shown in FIG. 14.

Figure 14:
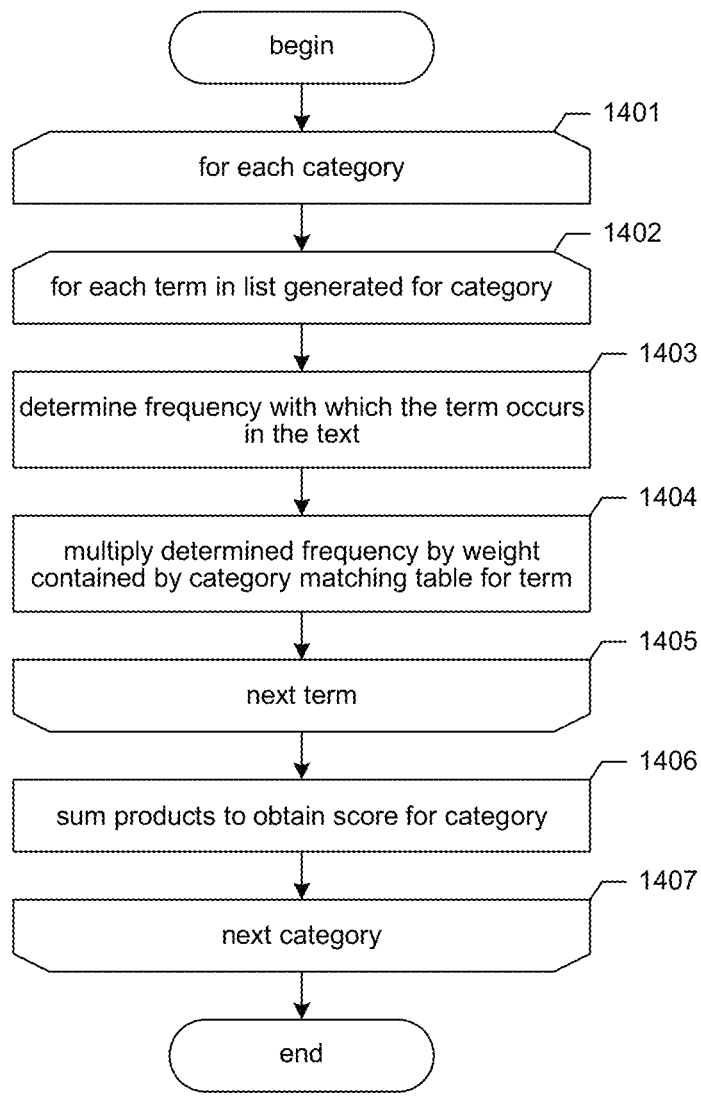
FIG. 14 is a flow diagram showing steps typically performed by the facility in order to determine a score for each category indicating the extent to which the text relates to the category.

FIG. 14 is a flow diagram showing steps typically performed by the facility in order to determine a score for each category indicating the extent to which the text relates to the category. In steps 1401-1407, the facility loops through each category. In steps 1402-1405, the facility loops through each or word or phrase in the list generated for the category in step 1202. In step 1403, the facility determines the frequency with which the word or phrase occurs in the text. In step 1404, the facility multiplies the frequency determined in step 1403 for the term by the weight contained by the category matching table for the term. For example, if the phrase "food server" occurs twice in the text, the facility multiplies the frequency of two by the weight of 0.44 shown in row 1313 of the category matching table to obtain the product 0.88. In some embodiments, as part of step 1404 (not shown), the facility further multiplies into the product the number of words contained by the term. To extend the example above for the phrase "food server," the facility multiplies the frequency of two by the weight of 0.44 by two words to obtain the product 1.76. In step 1405, if additional terms remain to be processed, then the facility continues in step 1402 to process the next term, else the facility continues in step 1406. In step 1406, the facility sums the products determined in step 1404 for the category to obtain a score for the category. In step 1407, if additional categories remain to be processed, then the facility continues in step 1401 to process the next category, else these steps conclude.

In some embodiments, rather than performing steps 1402-1406 to determine a score for a particular category, the facility uses the following formula:

$$\frac{\text{unique category terms in text}}{\text{unique terms in text matching any category}} + \frac{\text{total number of category term occurrences in text}}{\text{total number of occurrences in text of terms matching any category}}$$

In some embodiments, rather than performing steps 1402-1406 to determine a score for a particular category, the facility uses the following formula:

$$\frac{\text{unique category terms in text}}{\text{unique terms in text matching any category}} + \frac{\text{sum across each unique category term in text (number of occurrences of term in category} \times \text{number of words in term)}}{\text{total number of occurrences in text of terms matching any category}}$$

In some embodiments, rather than performing steps 1402-1406 to determine a score for a particular category, the facility uses the following formula:

$$\frac{\text{unique category terms in text}}{\text{unique terms in text matching any category}} + \frac{\text{sum across each unique category term in text (number of occurrences of term in category} \times \text{number of words in term} \times \text{term weight)}}{\text{total number of occurrences in text of terms matching any category}}$$

Returning to FIG. 12, in step 1204, the facility selects the category having the highest score. In step 1205, the facility generates a query containing at least a portion of the terms in the list generated for the selected category. In various embodiments, the facility generates a query containing all the terms in the list; only the terms in the list whose frequencies exceed a cutoff value; only the terms in the list having the top n frequencies; only the terms in the list whose frequency-weight products exceed a cutoff value; or only the terms in the list having the top n frequency-weight products. In step 1206, the facility submits the query generated in step 1205 to a stock photography search engine made available by a stock photography image service to obtain a query result identifying stock photography images matching the query. In some embodiments, the obtained query result lists the identified stock photography images in decreasing order of relevance to the submitted query, and/or includes an explicit relevance score for each identified stock photography image. In step 1207, the facility makes use of at least one of the stock photography images identified by the query result in generating an advertising message for the model page. In some embodiments, step 1207 involves selecting the most relevant stock photography image or images; paying the stock photography image service for the selected image or images; and automatically including the selected image or images in the advertising message generated by the facility. In some embodiments, step 1207 involves loading previews of several of the most relevant stock photography images into the media locker for the model web page, and only paying for any of these images when a user associated with the advertiser drags them from the media locker into the generated advertising message. In various embodiments, the operator of the facility explicitly passes on the actual cost of the used images to the advertiser; explicitly passes on a marked-up version of the cost of the used images to the advertiser; or charges the advertiser a total amount that incorporates the cost of the used images without explicitly identifying this cost. After step 1207, these steps conclude.

In some embodiments, rather than performing steps 1202-1205, the facility generates a query to be submitted to a stock photography search engine in step 1206 by submitting at least a portion of the unique terms occurring in the text to a set builder tool—such as Google's set building tool at http://labs.google.com/sets, Merriam Webster's Onelook Reverse Dictionary at http://www.onelook.com/reverse-dictionary.shtml, or an online thesaurus such as Sinonimi at http://sinonimi.sourceforge.net—and generates the query from the terms returned by the set builder tool. In various embodiments, the terms from the text submitted to the set builder tool are (a) all of the unique terms in the text, (b) the top n most frequent terms in the text, or (c) the terms in the text whose frequency exceeds a cutoff value.

In some embodiments, rather than performing steps 1201-1205, the facility solicits a set of words or phrases characterizing the model page from a user associated with the advertiser. In such embodiments, it is a query containing the solicited set of words or phrases that the facility submits to the stock photography search engine in step 1206.

It will be appreciated by those skilled in the art that the above-described facility may be straightforwardly adapted or extended in various ways. For example, the facility may generate advertising messages from model pages having a wide variety of file types and/or formats. The facility may extract a wide variety of kinds of content from the model page, and be used in conjunction with a variety of user interfaces for modifying and/or activating generated advertising messages. The feed used by the facility to automatically generate display advertising messages may describe advertising messages of a wide variety of types. The feed may be received or obtained from a variety of kinds of publishers, or sources of other types. The feed may be provided a wide variety of formats, may be assembled by the facility from the contents of multiple separate feeds, etc. The facility may use a wide variety of information retrieval and/or text mining techniques to generate a query from the text associated with the model page to select a stock photography image. Additionally, the facility may interact with a wide variety of different types of interfaces provided by stock photography image services to automatically select appropriate stock photography images. While the foregoing description makes reference to particular embodiments, the scope of the invention is defined solely by the claims that follow and the elements recited therein.

We claim:

1. A computer-readable storage medium storing instructions that, when executed by a computing system, cause the computing system to perform a process comprising:
   receiving a data feed including:
      an identification of a first web page on the world wide web from which a component can be extracted, wherein the component is formatted with one or more properties including a color;
   automatically identifying a second web page on the world wide web that contains an image for the display module; and
      extracting the image from the second web page;
      extracting the component from the first web page by parsing source code defining the first webpage; and
   generating the display module to incorporate the image extracted from the second webpage and format the display module based on the parsed source code to have a look and feel of the first webpage,
      wherein the parsed source code includes an indication of the one or more properties including the color of the component extracted from the first web page, and
      wherein the display module is formatted to match the color of the component extracted from the first webpage.

2. The computer-readable storage medium of claim 1, wherein automatically selecting the image for the display module comprises:
   determining that the first web page contains a reference to the second web page.

3. The computer-readable storage medium of claim 1, wherein automatically selecting the image for the display module comprises:
   selecting the second web page from a network domain that includes the first web page.

4. The computer-readable storage medium of claim 1, wherein automatically selecting the image for the display module comprises:
   determining that the first web page belongs to a first network domain; and
   selecting the second web page from a second network domain different from the first network domain.

5. The computer-readable storage medium of claim 1, wherein automatically selecting the image for the display module comprises:
   determining that the first web page is for a business entity; and
   identifying that the second web page is for the business entity,
      wherein the first web page and the second web page belong to a same or different network domains.

6. The computer-readable storage medium of claim 1, wherein automatically selecting the image for the display module comprises:
   determining that the first web page belongs to a first network resource; and
   selecting the second web page from a second network resource different from the first network resource.

7. The computer-readable storage medium of claim 1, wherein the display module is a first display module, and wherein generating a second display module comprises automatically selecting a second image for the second display module by:
   extracting text from a third web page on the world wide web identified in a second textual section for the second display module; and
   executing an image search process using a query that is based on one or more terms identified in the extracted text.

8. The computer-readable storage medium of claim 1, wherein automatically selecting the image for the display module comprises:
   extracting text from a textual section of the first web page;
   identifying, for each of multiple subject matter categories, terms in the extracted text that match that subject matter category;
   computing a score, for each of the subject matter categories, based upon a frequency of terms in the extracted text identified as matching that subject matter category; and
   executing an image search using a query that is based on the terms matching one of the subject matter categories with a highest score.

9. The computer-readable storage medium of claim 1, wherein the display module is a first display module, and wherein generating a second module comprises automatically selecting a second image for the second display module by:
   extracting text from a third web page on the world wide web identified in a second textual section for the second display module;
   identifying, for each of multiple subject matter categories, terms in the extracted text that match that subject matter category;
   computing a score, for each of the subject matter categories, based upon:
      a frequency of terms in the extracted text identified as matching that subject matter category, and
      a weight, assigned to each term in the extracted text identified as matching that subject matter category, indicating an extent to which the term relates to that subject matter category; and
   executing an image search using a query that is based on at least some of the terms matching one of the subject matter categories with a highest score.

10. A computing system for constructing advertising messages, the computing system comprising:
   one or more processors; and
   one or more memories storing instructions that, when executed by the one or more processors, cause the computing system to perform a process comprising:
      receiving a data feed including:
         an identification of a first web page on the world wide web from which a component can be extracted,
            wherein the component is formatted with one or more properties including a color;
      automatically identifying a second web page on the world wide web that contains an image for the display module; and
         extracting the image from the second web page;
         extracting the component from the first web page by parsing source code defining the first webpage; and
      generating the display module to incorporate the image extracted from the second webpage and format the display module based on the parsed source code to have a look and feel of the first webpage,
         wherein the parsed source code includes an indication of the one or more properties including the color of the component extracted from the first web page, and
         wherein the display module is formatted to match the color of the component extracted from the first webpage.

11. The computing system of claim 10, wherein automatically selecting the image for the advertising message comprises:
   determining that the first web page contains a reference to a second web page on the world wide web that includes the image.

12. The computing system of claim 10, wherein automatically selecting the image for the advertising message comprises:
   determining that the first web page belongs to a website; and
   selecting the image from a second web page on the world wide web from the website.

13. The computing system of claim 10, wherein automatically selecting the image for the advertising message comprises:
   determining that the first web page belongs to a website and presents content of a business entity; and
   identifying a second web page on the world wide web that belongs to another website other than the website of the first web page and presents content of the business entity,
      wherein the second web page includes the image.

14. The computing system of claim 10, wherein automatically selecting the image for the advertising message comprises:
- determining that a second web page on the world wide web includes the image; and
- determining that the first web page and the second web page present information about a particular business entity,
  - wherein the advertising message is for the particular business entity.

15. The computing system of claim 10, wherein automatically selecting the image for the advertising message comprises:
- selecting the image from a repository of images.

16. The computing system of claim 10, wherein automatically selecting the image for the advertising message comprises:
- determining that a second web page on the world wide web includes the image; and
- selecting the second web page from a network resource different from another network resource of the first web page,
  - wherein the first web page and the second web page are for a common business entity.

17. A computer-readable storage medium storing instructions that, when executed by a computing system, cause the computing system to perform a process comprising:
- receiving a data feed including, for each of multiple content sections:
  - an identification of a first web page on the world wide web from which a component can be extracted,
    - wherein the component is formatted with one or more properties including a color;
- automatically identifying a second web page on the world wide web that contains an image for the display module; and
- extracting the image from the second web page;
- extracting the component from the first web page by parsing source code defining the first webpage; and
- generating the display module to incorporate the image extracted from the second webpage and format the display module based on the parsed source code to have a look and feel of the first webpage,
  - wherein the parsed source code includes an indication of the one or more properties including the color of the component extracted from the first web page, and
  - wherein the display module is formatted to match the color of the component extracted from the first webpage.

18. The computer-readable storage medium of claim 17, wherein automatically selecting the particular image for the particular display module comprises:
- determining that the particular corresponding web page contains a reference to the particular related web page.

19. The computer-readable storage medium of claim 17, wherein automatically selecting the particular image for the particular display module comprises:
- determining that the particular corresponding web page and the particular related web page belong to a same network domain.

20. The computer-readable storage medium of claim 17, wherein automatically selecting the particular image for the particular display module comprises:
- determining that the particular corresponding web page is targeted to a particular business entity; and
- determining that the particular related web page is targeted to the particular business entity,
  - wherein the particular corresponding web page and the particular related web page belong to a same or different network domains.

* * * * *